United States Patent [19]
Zekely et al.

[11] Patent Number: 5,084,089
[45] Date of Patent: Jan. 28, 1992

[54] METHOD FOR IN-LINE INDUCTION HEATING OF MOLTEN METALS FOR SUPPLYING CONTINUOUS CASTING DEVICES

[76] Inventors: Julian Zekely, Rm. 4-117 Massachusetts Institute of Technology, Cambridge, Mass. 02193; Alfredo Riviere, Parque Cristal Bldg. West Tower 9th Flr., Los Palos Grandes, Caracas, Venezuela

[21] Appl. No.: 482,528

[22] Filed: Feb. 21, 1990

[51] Int. Cl.⁵ .................................. C22B 4/00
[52] U.S. Cl. .................... 75/10.12; 75/10.15
[58] Field of Search ............. 75/10.12, 10.14, 10.15, 75/10.16, 10.17, 382

[56] References Cited

U.S. PATENT DOCUMENTS

| | | | |
|---|---|---|---|
| 4,668,288 | 5/1987 | Ouchi et al. | 75/678 |
| 4,769,066 | 9/1988 | Eidem | 75/10.14 |
| 4,836,273 | 6/1989 | Cigretti et al. | 75/10.15 |

Primary Examiner—Melvyn J. Andrews
Attorney, Agent, or Firm—Helfgott & Karas

[57] ABSTRACT

The present invention provides a method and apparatus for in-line heating of molten metals for supplying continuous casting devices, particularly for use in the continuous casting of non-ferrous metals.

9 Claims, 2 Drawing Sheets

METHOD FOR IN-LINE INDUCTION HEATING OF MOLTEN METALS FOR SUPPLYING CONTINUOUS CASTING DEVICES

FIELD OF THE INVENTION

This invention relates to a method and apparatus for in-line induction heating of molten metals for supplying continuous casting devices, particularly for use in the continuous casting of non-ferrous metals.

BACKGROUND OF THE INVENTION

It is a recognized fact that the quality of continuously cast metal products, as measured in terms of crystal grain size, the relative proportion of equiaxed vs. columnar crystals and micro crystalline segregation will be significantly affected by the degree of superheat of the molten metal stream which is introduced into any given casting device.

The problem has been addressed to a limited extent in the steel industry, through the use of tundish heaters employed in the conventional continuous casting of steel. The tundishes used in these installations are typically rectangular troughs, approximately 5-7 meters in length, about 0.5-1 meter deep and about 1 meter wide. Such tundishes are capable of processing between about 50-400 tons of steel per hour. The molten metal flowing through these tundishes may be heated either by induction, or by the application of plasma torches. In induction heating the technologies employed include "channel furnace type" arrangements or the placement of induction coils next to the vertical walls of the tundish. In conventional steelmaking applications these tundish heaters are primarily used to compensate for the heat losses experienced in the ladle, from which the steel is being fed and a temperature control within about 10°-30° C. is considered to be the ultimate attainable goal.

A substantially different problem is presented in many applications involving the continuous casting of various non-ferrous metals or alloys using, for example, the Hazelett technique, the wheel casting of bars, the roll casting of sheet, as well as in the novel, near net shape casting of steel, using, for example, the SMS process, wheel casting, the Hazelett technique, single or twin roll casting and the like.

In these systems the tundish used to continuously feed the molten metal tends to be much smaller, for example, approximately 0.5-1 m long, approximately 20-200 mm deep and about 100-500 mm wide, than that utilized in typical steel applications. While the precise temperature control of the liquid entering the caster in these latter systems would be even more important than in case of conventional steel casting technology, tundish heaters have not been used in such shallow tundish applications, due to the inherent difficulties that are necessarily encountered in the induction heating of shallow melts, such as are encountered in these applications. Nonetheless, precise temperature control is most desirable in such applications in order to minimize segregation and to improve the microstructure of the continuously cast products.

In essence, three types of problems can be encountered in such shallow tundish feeder arrangements:

First, it is difficult to couple a shallow melt to electromagnetic heating coils, and thus one experiences "end effects" leading to very poor overall thermal efficiency which is unacceptable in commercial applications.

Second, at higher electrical power input levels, often required to achieve the thermal effect desired, one encounters major disturbances of the free surface of the molten metal in the shallow tundish, which can and often does cause eruptions of the molten metal and thereby creates material loss and an unstable flow of metal to the castor device.

Third, induction stirring resulting from high energy inputs, needed to achieve the desired thermal effect, can also introduce undesirable turbulence resulting in flow disturbances, which could interfere with the steady, smooth supply of the liquid metal to the caster device, which is an essential requirement, particularly in sheet or bar caster applications.

The only prior art of which the applicant is aware involves the use of induction or plasma heaters in the tundish itself. The applicant knows of no prior art teaching the use of a separate vessel, connected to the tundish, which can be heated or cooled, without disturbing the metal flow in the tundish itself which is a novel feature of the present invention.

In conventional steelmaking operations, a ladle furnace is employed wherein the temperature of the molten metal is adjusted before feeding to the tundish. However, such ladle furnaces operate in a batch mode, and thus precise temperature control is impossible to achieve.

None of the aforementioned prior art teach the particular combination of features of the present invention which allows one to overcome the aforementioned specific problems.

It is, therefore, a purpose of the present invention to provide a method and apparatus to achieve very precise temperature control of the liquid metal stream entering the continuous caster apparatus, by the use of a tundish and induction heating means, such that the above mentioned obstacles are obviated.

DETAILED DESCRIPTION OF THE INVENTION

Figure 1:
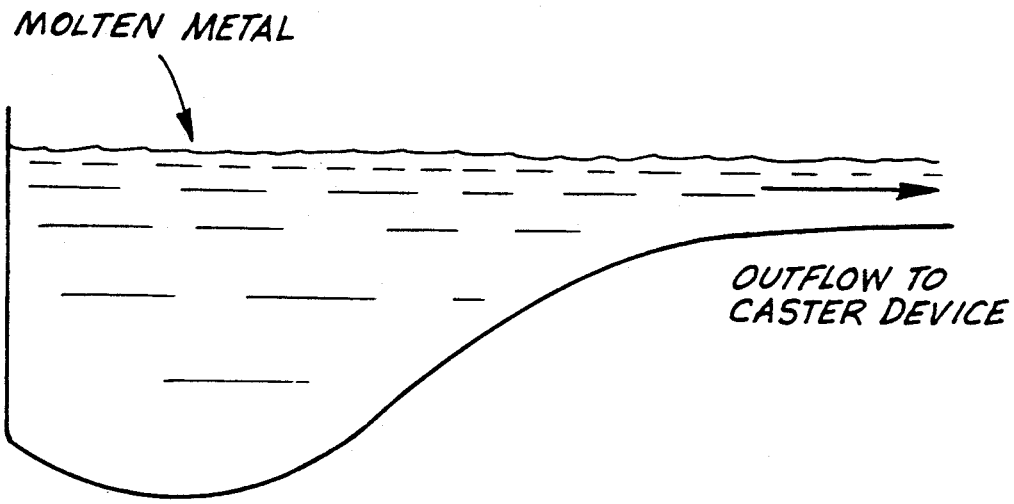
FIG. 1 is a schematic representation of a conventional tundish feeder arrangement used in the prior art.
Figure 2:
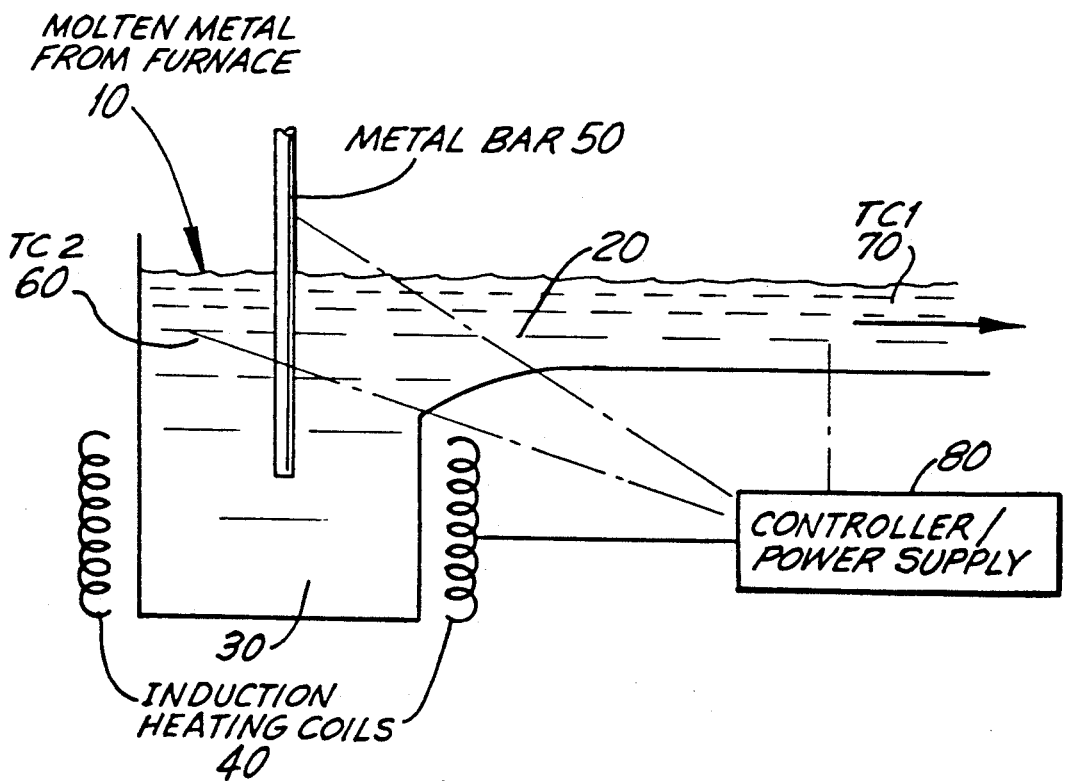
FIG. 2 is a schematic representation of the apparatus of the present invention showing the essential features.

A schematic representation of the tundish heating and feeding apparatus of the present invention is presented in FIG. 2 where it can be seen that the metal stream poured from the furnace (10) into the tundish (20) is introduced into an intermediate vessel (30), which may be both inductively heated via induction coils (40), or cooled by the immersion of a metallic rod (50), the composition of which rod is identical to the metal being cast. This inductively heated vessel is significantly deeper than the metal level in the tundish (at least 100-200 mm) so that the problems associated with the heating of shallow melts will be avoided. The temperature of the incoming melt (60) as well as the outgoing molten metal (70) is closely monitored by a controller (80), which regulates energy input to the induction coils as well as the input speed of the metal bar.

In one contemplated variation on the arrangement set forth in FIG. 2, the inductively heated intermediate vessel is provided with coils which are connected to both a medium or high frequency supply to provide heating and to a low frequency supply to provide agitation or stirring.

This later arrangement enables one to promote melting of the immersed rod with minimal application of additional heat input and at the same time ensure the rapid dispersion of the supplemental alloy material added to the melt from the melting metal rod.

The apparatus described above permits one to retain the original tundish shape so that the calming effect of flow of molten metal through a relatively long channel would remain.

In yet another alternative arrangement it is contemplated that a porous filter may also be fitted in the tundish to ensure a smooth flow to the casting system.

It is further contemplated that the temperature of the metal stream entering the induction heated/stirred vessel and that exiting the tundish will be continuously monitored with the aid of thermocouples, the readings of which would then drive the controller of the power input to the induction heating coil.

If the temperature of the metal stream entering the inducted heating vessel is higher than the desired value, small adjustments in the temperature can be made by adjusting the feed rate of the solid metal bar which is being introduced into the stirred vessel. It has been found that the arrangement provided will result in very precise temperature control, in the 1°-2° C. range.

Figure 3:
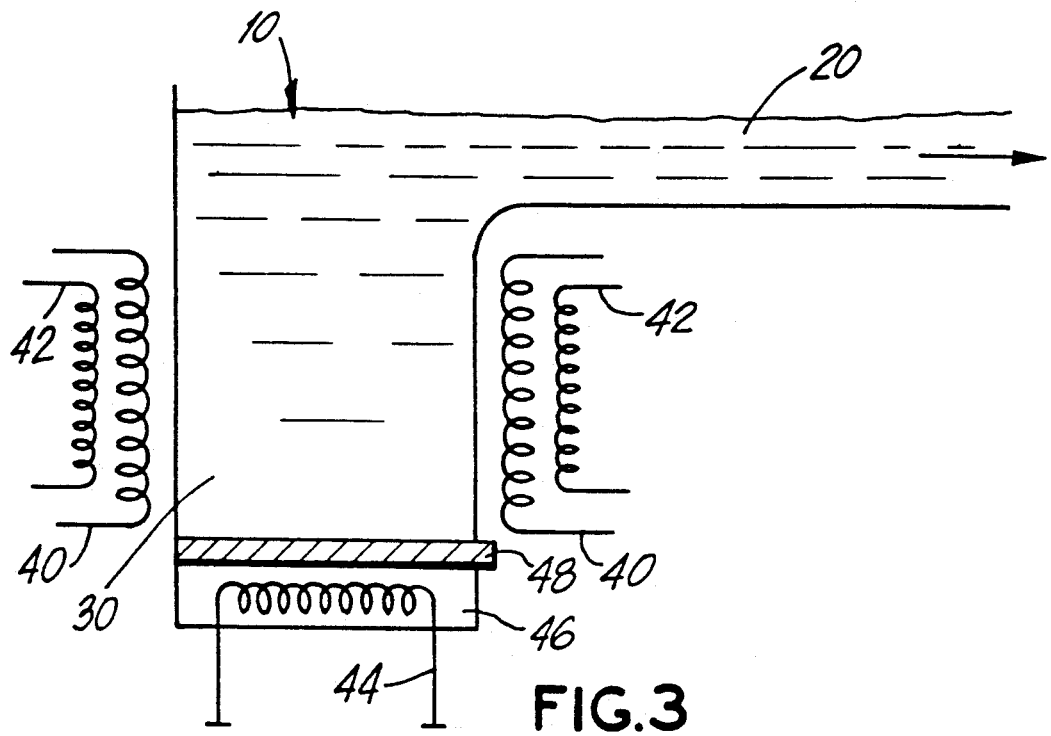
FIG. 3 is a schematic representation of an alternative apparatus arrangement according to the present invention, showing an alternative cooling arrangement.

With reference to FIG. 3, which shows an alternative arrangement of the apparatus of the present invention, auxiliary cooling is provided by employing a water cooled metal bottom for the intermediate vessel (30) which is attached to the tundish (20), into which vessel the molten metal (10) is introduced, inductively heated by electrical coils (40) and electromagnetically stirred by coils (42). The vessel is provided with a solid metal block bottom (46) which is cooled by circulating cooling medium through a cooling coil (44). In the event cooling may not be desired or needed, the metal bottom is shielded from the molten metal stream by use of a sliding plate (48) which is shown in place.

By providing adequate agitation in the melt and by means of adjustment of the cooling water flow rates it is possible to cool the melt in the intermediate vessel without the formation of a solidified shell. Calculations have shown that by operating in this manner, it is possible to remove about 5°-15° C. superheat from the melt, when operating with aluminum or copper as the molten metal.

It is contemplated that the method and apparatus described here will be beneficial in overcoming the previously described problems in feeding molten metal streams fed to a variety of continuous caster devices, including those utilized in the casting of aluminum bars, sheets, and ingots and in casting similar shapes for copper, as well as in the continuous casting of steel bars, thin slabs of steel, and steel sheet.

For example, in the continuous wheel casting of aluminum and aluminum alloys using a wheel caster, the typical casting rate is in the range of approximately 6 tons/hr. A typical tundish which might be beneficially employed in feeding the wheel caster is presented in FIG. 4.

Figure 4:
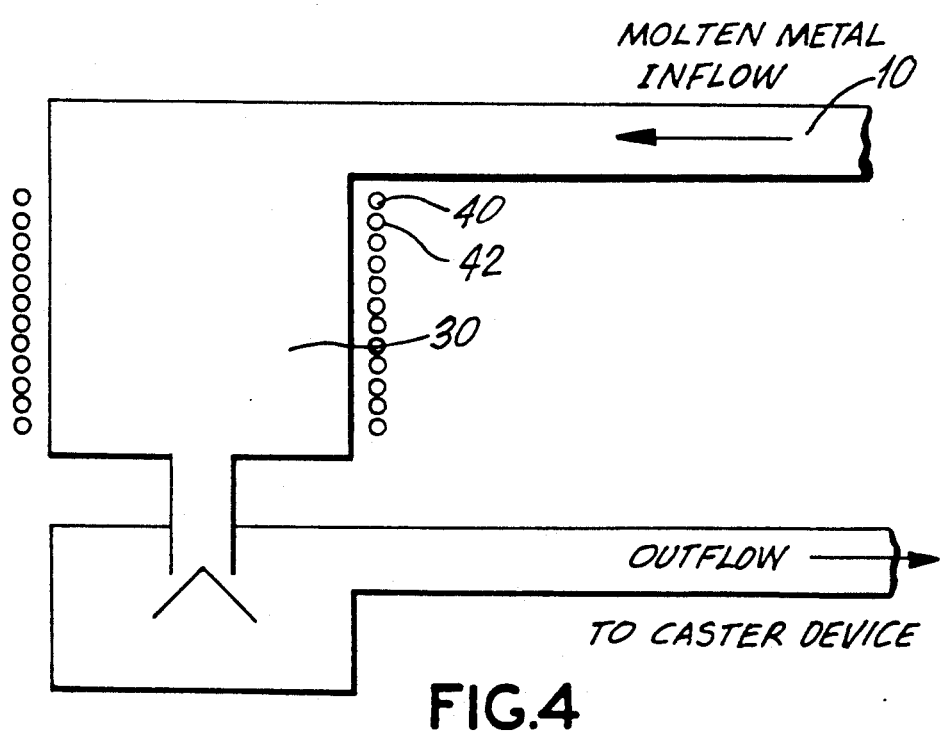
FIG. 4 is a schematic representation of yet another possible alternative arrangement of the apparatus of the present invention.

With reference to FIG. 4, in carrying out the method of the present invention, the well (30) into which the molten metal (10) is poured would be made deeper than in conventional aluminum casting arrangements, providing a metal depth of about 300-400 mm. Heating is provided by a standard single phase coil (40) arrangement, for example, 18 turns, 1,000 Hz to 3,000 Hz and a nominal power input to the molten metal of 50 kW. A stirring coil (42) would be provided having a 3 phase design, using low frequency, of approximately 60 Hz and a power input of less than about 1 kW into the molten metal.

In another application, in the casting of sheet or plate, either by a Hazelett or a Twin Roll casting system, the tonnage to be handled would be substantially higher, with the typical tonnages in the range of 20-60 tons/hr. Under these conditions the inductively stirred vessel and the additional heating capacity would have to be appropriately scaled upward. Thus in handling, for example, 25 tons/hr. of aluminum, it is contemplated that one would require nominal power input of about 250 kW. The heating vessel size would also be increased to having a depth of approximately 600 mm and a diameter of approximately 600 mm. Optimum heating and stirring frequencies would be chosen according to the actual size and throughput to be achieved.

The method and apparatus of the present invention may be readily applied to the continuous belt, wheel or roll casting of other metals, including steel, copper and their alloys. Indeed, the provision of an auxiliary heating arrangement would be particularly helpful for the near net shape casting of steel and its alloys, where the careful control of the superheat is also critical.

Other applications of the method and apparatus described herein will be apparent to those skilled in the art of molten metal casting.

While the invention has been described with respect to a number of specific examples and embodiments, it will be understood that the invention may be variously practiced within the scope of the following claims.

We claim:

1. A method for controlling the temperature of molten metal to be fed to a continuous casting device, comprising feeding molten metal to an inductively heated deep well vessel, adjusting the temperature of said molten metal and thereafter discharging said molten metal from said deep well vessel and feeding said molten metal into a tundish feeder arrangement, and further comprising moderating the temperature of said molten metal in said deep well vessel by inserting a metal bar directly into said molten metal in said deep vessel under controlled insertion conditions.

2. A method according to claim 1 wherein said molten metal is fed into a deep well vessel attached to the tundish feeder.

3. A method according to claim 1 wherein said molten metal is fed into a deep well vessel separate from said tundish feeder.

4. A method for controlling the temperature of molten metal to be fed to a continuous casting device, comprising feeding molten metal to an inductively heated deep well vessel, adjusting the temperature of said molten metal and thereafter discharging said molten metal from said deep well vessel and feeding said molten metal into a tundish feeder arrangement, and further comprising heating said inductively heated deep well vessel and its contents by inputting power to an inductive heating coil located in said vessel.

5. A method according to claim 4 wherein the temperature of said molten metal in said deep well vessel is controlled by sensing the temperature of said molten metal being fed into said deep well vessel and said molten metal being discharged from said deep well vessel and adjusting the power input to the inductive heating coil accordingly.

6. A method according to claim 4 wherein agitation of said molten metal is effected by varying electrical energy input to at least some of the inductive heating coils.

7. A method according to claim 4 said inputed power is high frequency electrical energy and applying said high frequency electrical energy to one or more electrical coils at low or moderate frequencies to at least one separate electrical coil to agitate said molten metal.

8. A method for controlling the temperature of molten metal to be fed to a continuous casting device, comprising feeding molten metal to an inductively heated deep well vessel, adjusting the temperature of said molten metal and thereafter discharging said molten metal from said deep well vessel and feeding said molten metal into a tundish feeder arrangement, and further comprising cooling said molten metal in a deep well vessel provided with a metal bottom having a cooling coil located therein, said cooling being effected by circulating a cooling medium throughout said cooling coil located within said metal bottom of said deep well vessel.

9. A method according to claim 8 comprising simultaneously cooling and agitating said molten metal by electrical inductive agitation of said molten metal in said deep well vessel, under conditions controlling said cooling medium and said electrical energy input to prevent the formation of a solidified metal shell.

* * * * *